July 19, 1938.　　　R. O. HAMILL　　　2,123,944
RESET MECHANISM FOR DEMAND REGISTERS
Filed July 15, 1936　　　3 Sheets-Sheet 1

Inventor:
Ret O. Hamill
By: Brown, Jackson, Boettcher & Dienner.
Attys.

July 19, 1938.  R. O. HAMILL  2,123,944
RESET MECHANISM FOR DEMAND REGISTERS
Filed July 15, 1936   3 Sheets-Sheet 2

Inventor:
Ret O. Hamill
By: Brown, Jackson, Boettcher & Dienner
Attys.

July 19, 1938.  R. O. HAMILL  2,123,944
RESET MECHANISM FOR DEMAND REGISTERS
Filed July 15, 1936   3 Sheets-Sheet 3

Inventor:
Ret O. Hamill
By: Brown, Jackson, Boettcher & Dienner
Attys.

Patented July 19, 1938

2,123,944

UNITED STATES PATENT OFFICE 2,123,944

RESET MECHANISM FOR DEMAND REGISTERS

Ret O. Hamill, Elmhurst, N. Y., assignor to Sangamo Electric Company, Springfield, Ill., a corporation of Illinois Application July 15, 1936, Serial No. 90,718

4 Claims. (Cl. 235—144)

My invention relates generally to resetting mechanisms and it has particular relation to the construction of such a mechanism for resetting the maximum demand pointer of a watt hour meter.

The embodiment of the invention disclosed herein constitutes a modification of and an improvement on the resetting mechanism for watt hour meters disclosed in my copending application, Serial No. 90,717, filed July 15, 1936.

According to my copending application I have provided a mechanism for resetting the maximum demand pointer of a watt hour meter which requires only a complete rotation of an external operating arm to move a finger on it inside of the glass cover of the meter through substantially the same arc as the maximum demand pointer moves for restoring it to its initial position. When the finger reaches a predetermined position, which should correspond to the initial position of the maximum demand pointer, a driving connection between it and the external operating lever is released and the finger is restored to a position corresponding to the maximum position to which the maximum demand pointer may be operated under the influence of a spring.

The resetting mechanism is arranged to be mounted in suitable openings through the glass cover of the watt hour meter. While the construction of the glass covers and the openings therein for mounting the resetting mechanisms may be fairly uniform, it is not feasible to manufacture the covers on a mass production basis as exact duplicates. Some provision should be made to accommodate slight misalignment between the internal finger and the maximum demand pointer while still permitting the latter to be restored exactly to its initial position. The construction disclosed in my copending application requires that a fairly accurate alignment of the parts be obtained, and consequently it is not entirely satisfactory from a mass production standpoint.

It is desirable to provide an indication of the number of times that the maximum demand pointer has been reset, or to indicate the particular billing period, for example the month, for which the maximum demand pointer indicates the maximum demand. This indication is of value both to the power company and to the consumer, since it provides a definite record of the number of times the maximum demand pointer has been reset or the particular period during which the position of the maximum demand pointer indicates the maximum demand.

It is, therefore, an object of my invention, generally stated, to provide an improved resetting mechanism for watt hour meters which shall be simple and efficient in operation and which may be readily and economically manufactured and installed.

An important object of my invention is to provide a flexible connection between the externally operated restoring finger of a resetting mechanism and the maximum demand pointer of the watt hour meter with which it is associated.

Another important object of my invention is to provide for automatically counting the number of times the maximum demand pointer of a watt hour meter is reset.

A further object of my invention is to provide an adjustable stop for the initial position of a restoring finger of a resetting mechanism for the maximum demand pointer of a watt hour meter.

Still another object of my invention is to combine all of the foregoing features in a single resetting mechanism.

Other objects of my invention will in part be obvious and in part appear hereinafter.

My invention, accordingly, is disclosed in the construction hereinafter set forth and it comprises the features of construction, combination of elements, and arrangement of parts as indicated in the accompanying drawings, and the scope of the application of which will be indicated in the appended claims.

For a more complete understanding of the nature and scope of my invention reference may be had to the following detailed description, taken in connection with the accompanying drawings, in which.

Figure 1:
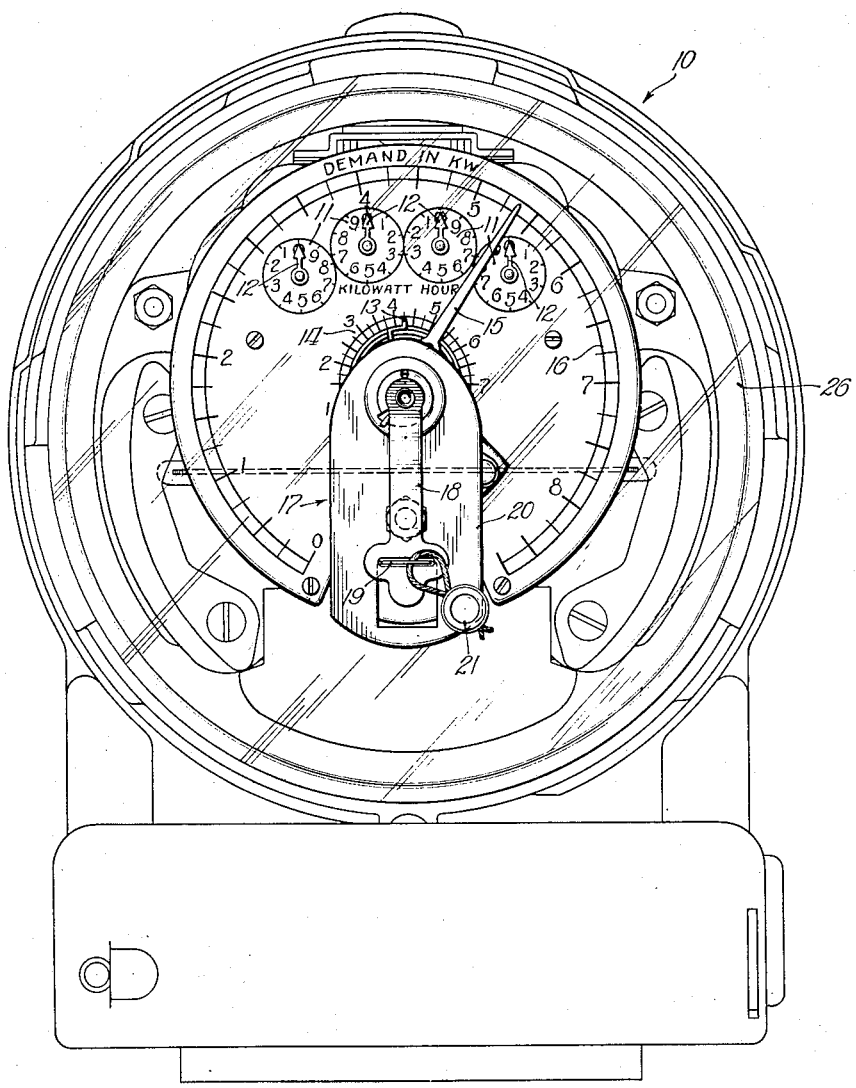
Figure 1 is a view, in front elevation, showing a conventional type of watt hour meter to which my novel resetting mechanism may be applied.

According to the construction disclosed in my copending application, hereinbefore referred to, and as shown herein, I provide a finger mounted inside of the cover of a watt hour meter and rotatable through substantially the same arc as the maximum demand pointer for engagement therewith. A spring is provided for biasing the finger to a position corresponding to the maximum position to which the maximum demand pointer can be operated. The finger is rotated by means of a shaft which extends through the cover and which may be rotated manually by the meter man when he reads the meter. The shaft is mounted not only for rotation but is also mounted for translatory motion relative to the cover by means of a cam collar having a notch in its surface with which a transverse pin in the shaft is arranged to engage. One side of the notch is substantially perpendicular to the cam surface, while the other side is inclined thereto. As the shaft is rotated and the pin moves up the inclined side of the notch, the shaft is moved outwardly to engage the finger, which in turn engages the maximum demand pointer on rotation to the position to which it has been operated. The notch in the cam collar is so positioned that, when the maximum demand pointer has been restored to its initial position, the pin will be moved over the perpendicular side of the notch to permit the shaft to be moved inwardly under the influence of a biasing spring to release the driving engagement between it and the finger. The finger is then restored to its initial position by its spring and the operation may be repeated. It is only necessary that the meter man rotate the operating arm through a complete revolution to restore the maximum demand pointer to its initial position.

In view of the fact that it is not feasible to construct the glass covers and apply the resetting mechanisms thereto in exactly duplicate relationship, it is desirable that a flexible connection be provided between the finger, which rotates through the same arc as the maximum demand pointer, and the pointer. For this purpose I have provided the finger with a pin for engagement with the maximum demand pointer, the pin having limited relative movement with respect to the finger. A spring is provided on the finger for biasing the pin against the maximum demand pointer on engagement therewith. If the maximum demand pointer is restored to its initial position before the driving connection between the finger and the externally operable member is released, this spring will be stretched to the extent necessary to permit the finger to continue to move while the pin remains stationary in engagement with the maximum demand pointer. Since a considerable range of movement may be provided in the mounting of the pin on the finger, it is not essential that the resetting mechanism be aligned with a high degree of accuracy.

Advantage is taken of the fact that the shaft extending through the cover is rotated through one complete revolution for each time that the maximum demand pointer is reset to provide a counting mechanism for cooperation therewith to indicate the number of times that the pointer has been reset or the particular period during which its position indicates the maximum demand. For this purpose a gear train is provided which terminates in a counting disc having engraved thereon the names of the months of the year, for example. The gear reduction of the gear train is so arranged that the counting disc rotates through one complete revolution while the shaft which extends through the cover is rotated twelve times. A window is provided in the resetting mechanism through which the particular position of the counting disc may be observed, as indicated by the name of the months there appearing.

Since it is desirable that the resetting mechanism be arranged for operation in one direction only, a ratchet wheel is provided for rotation with the counting disc having cooperating therewith a spring pressed pawl. The ratchet wheel is so arranged as to permit the rotation of the shaft in one direction while preventing rotation thereof in the opposite direction.

Referring now particularly to Figure 1 of the drawings, the reference character 10 designates, generally, a watt hour meter of a conventional type having the customary dials at 11, with which pointers 12, driven by the watt meter mechanism, cooperate to indicate the kilowatt hours consumed in the circuit to which the meter is connected. In order to indicate the maximum demand during any interval, a maximum demand indicator 13 is provided and is arranged to cooperate with a scale 14. The maximum demand indicator 13 is driven by the watt meter mechanism, which also drives the pointers 12. However, it is periodically reset, for example, every fifteen minutes, by means of a clock mechanism, such as an electric clock, so that its position at any time indicates the kilowatt demand up to the time that it is observed for that particular interval.

Since it is desirable to provide an indication of the maximum kilowatt demand during any interval, a maximum demand pointer 15 is provided, the position of which is controlled by the maximum demand indicator 13. That is, the maximium demand pointer 15 is driven, by engagement therewith, by the maximum demand indicator 13. However, when the maximum demand indicator 13 is restored to its initial position by the clock mechanism, the maximum demand pointer 15 remains in the position to which it has been moved by the maximum demand indicator 13. There is, therefore, a permanent indication of the maximum demand that has occurred in the circuit during any interval. As shown, the maximum demand pointer 15 is arranged to cooperate with a scale 16, which may be calibrated the same as scale 14, so that the maximum demand may be readily noted.

With a view to periodically resetting the maximum demand pointer 15, a resetting mechanism, shown generally at 17, is provided. The resetting mechanism 17 is provided with an externally operable operating arm 18 which is arranged to be secured to an upstruck lug 19 of a plate 20 by means of a seal 21. It will be understood that the seal 21 is provided to prevent any unauthorized operation of the operating arm 18.

Figure 2:
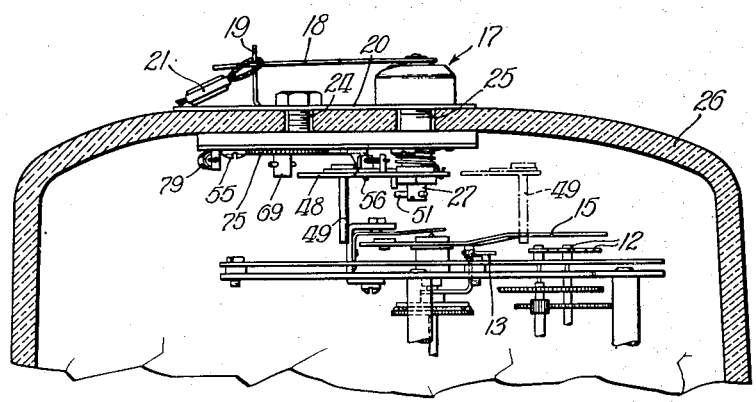
Figure 2 is a view, in side elevation, of the resetting mechanism, the cover of the watt hour meter being shown in section.

As shown more clearly in Figure 2 of the drawings, the resetting mechanism 17 is mounted in suitable openings 24 and 25 in the central part of a glass housing or cover 26, with which the meter 10 is usually provided. The resetting mechanism 17 is arranged to be mounted entirely on the glass cover 26, so that when it is removed from the meter the entire resetting mechanism is also removed.

Figure 5:
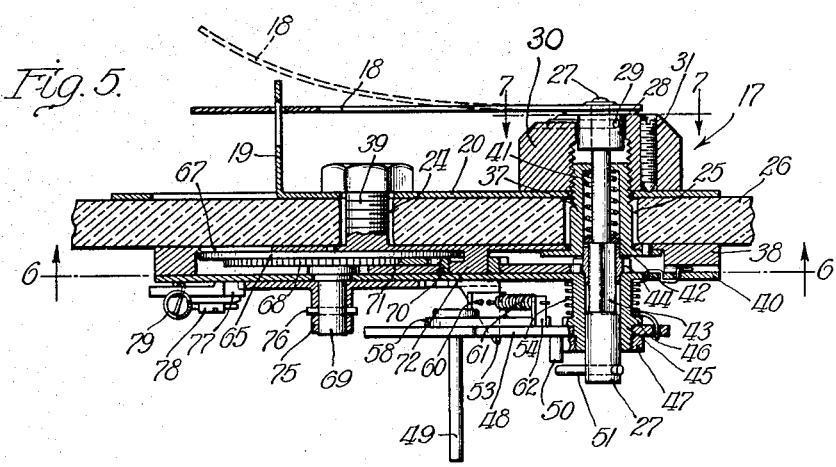
Figure 5 is a sectional view, on an enlarged scale, taken along the line 5—5 of Figure 6.

The details of construction of the resetting mechanism are illustrated more clearly in Figure 5 of the drawings. As there shown, the operating arm 18 is mounted for rotation with a shaft 27 and is provided with a downwardly extending boss 28 through which a pin 29 is positioned for securing them together and for an additional purpose which will presently be set forth. The boss 28 is mounted for rotation in the center of a cam collar 30, which may be secured in a predetermined position on the plate 20 by means of a set screw 31, as illustrated.

Figure 7:
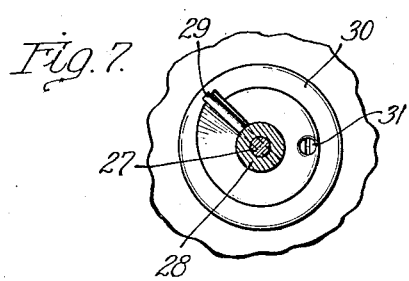
Figure 7 is a sectional view taken along the line 7—7 of Figure 5.
Figure 8:
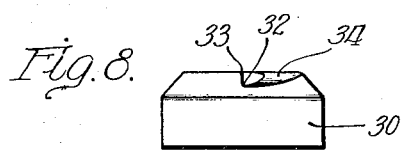
Figure 8 is a view, in side elevation, of the cam collar.

As illustrated more clearly in Figures 7 and 8 of the drawings, the pin 29 extends outwardly from one side of the boss 28 and rides upon the top surface of the cam collar 30. The cam collar 30 is provided with a notch 32 having one side 33 disposed substantially perpendicular thereto, while the other side 34 is inclined so that the pin 29, on turning of the shaft 27, may ride up it to cause the shaft to move outwardly relative to the glass cover 26, for a certain purpose which will be set forth in detail hereinafter.

The undersurface of the cam collar 30 is provided with a threaded opening with which the upper end of a hollow stem 37 is disposed in threaded engagement. The hollow stem 37 extends through a suitable opening in the bottom of a casing 38 and through the opening 25 in the glass cover 26. As shown, the casing 38 is mounted on the inside of the cover 26 and is provided with a stud 39 which extends through the opening 24 and is secured in position by means of a nut. A cover plate 40 is provided for covering the casing 38.

With a view to biasing the shaft 27 downwardly or inwardly, a coil spring 41 is disposed in the hollow stem 37 around the upper end of the shaft 27 and between a washer 42 and the inner end of the hollow stem 37. The washer 42 is biased against a shoulder formed by a square shank 43 of the shaft 27 on which is slidably mounted a pinion 44 for effecting the operation of the counting mechanism as will be described hereinafter. The lower end of the shaft 27 extends through a hollow sleeve extension 45 of the cover plate 40, which is provided with an integrally formed shoulder 46 and the lower end of which is threaded for positioning thereon a nut 47. Mounted in the groove formed between the shoulder 46 and the nut 47 is a finger 48 which is arranged to carry a downwardly extending pin 49 for engagement with the maximum demand pointer 15. The finger 48 is also provided with a short downwardly extending pin 50 with which an arm 51 extending from the shaft 27 is disposed to engage, for rotating the finger 48 to restore the maximum demand pointer 15 to its initial position.

Figure 3:
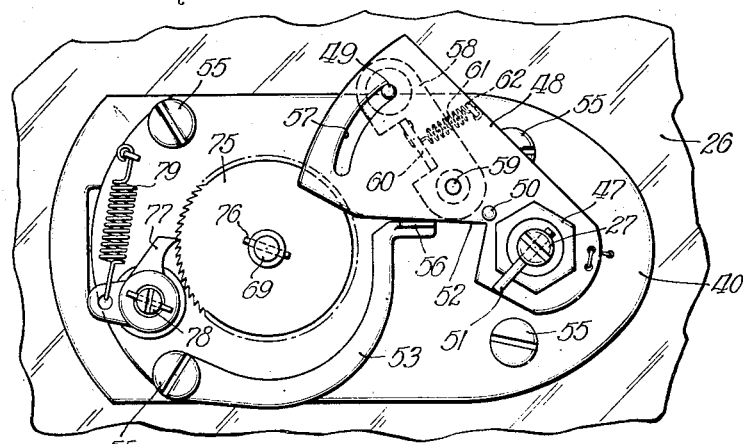
Figure 3 is a view, in bottom plan, of the resetting mechanism shown in Figure 2.

The construction of the finger 48 is illustrated in more detail in Figure 3 of the drawings. As there shown, the finger 48 comprises a plate which is provided with a portion 52 that is cut away to provide a surface with which a stop arm 53 may engage. The stop arm 53 may be adjustably positioned to determine the initial position of the finger 48, which may be biased thereto by means of a coil spring 54, (Figure 5), one end of which may be connected to the cover plate 40 while the other end is connected to the finger 48. The stop arm 53 may be adjustably positioned on one of the screws 55 which are used for securing the cover plate 40 on the casing 38. An upturned tongue 56 is provided at the end of the stop arm 53 for engaging the cut-away portion 52 of the finger 48.

As set forth hereinbefore, it is desirable to provide a flexible connection between the pin 49 and the maximum demand pointer 15, so that it will be unnecessary to align the resetting mechanism with a high degree of accuracy. For this purpose the pin 49 is arranged to move in a slot 57 in the finger 48 and is carried by means of an arm 58 which is pivotally mounted at 59. The arm 58 is provided with an upturned lug 60 to which a tension spring 61 may be connected. The other end of spring 61 may be connected to a pin 62 carried by the finger 48. When the finger 48 is rotated the pin 49 engages the maximum demand pointer 15 and tends to stretch the spring 61. If the driving connection between the pin 50 and the arm 51 is not released at the time that the pointer 15 is restored to its initial position, the continued rotation of the finger 48 will not cause any further movement of the pointer 15 but rather the pin 49 will move in the slot 57 and will further tension the spring 51. It will be obvious that this provides a flexible connection with the maximum demand pointer 15 without in any way interfering with the functioning of the resetting mechanism.

Figure 4:
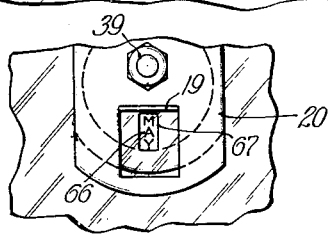
Figure 4 is a fragmentary view looking through the glass cover to show the counting disc.
Figure 6:
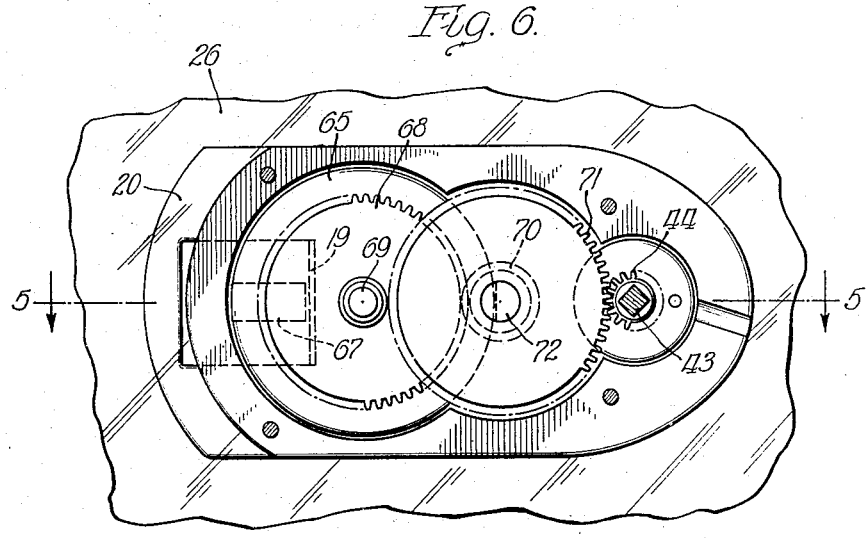
Figure 6 is a sectional view of the resetting mechanism, on an enlarged scale, taken along the line 6—6 of Figure 5.

In order to indicate the number of times that the maximum demand counter 15 is reset, a disc 65 is provided in the casing 38, as illustrated in Figure 6 of the drawings. The names of the twelve months of the year may be suitably engraved near the periphery of the disc 65, as indicated at 66 in Figure 4 of the drawings. The position to which the disc 65 is operated, as indicated by the name of the month which appears thereon, may be observed through a window 67 located in the bottom of the casing 38. The window 67 registers with the opening formed in the plate 20 by the removal of the lug 19 and therefore the position of the disc 65 may be observed through the glass cover 26, as will be readily understood.

The disc 65 is mounted for rotation with a gear wheel 68 on a stub shaft 69 that extends through the cover plate 40. The disc 65 and gear wheel 68 rotate with the shaft 69. The gear wheel 68 is positioned in driving engagement with a pinion 70 which is mounted for rotation with a gear wheel 71 on a second stub shaft 72 that is mounted in the casing 38. As illustrated, the gear wheel 71 meshes with the pinion 44 which rotates with the square shank 43 of the shaft 27 on movement thereof by the operating arm 18. The gear reduction between the pinion 44 and gear wheel 68 is such that one complete revolution of the disc 65 is effected by twelve complete revolutions of the shaft 27. It will be understood, of course, that any other suitable ratio may be used to indicate the number of times that the maximum demand pointer 15 is reset to its initial position.

Referring again to Figure 3 of the drawings, it will be observed that a ratchet wheel 75 is mounted for rotation with the stub shaft 69 by means of a pin 76. A pawl 77 pivotally mounted on a short shaft 78, carried by the cover plate 40, and biased by a spring 79, is arranged to cooperate with the ratchet wheel 75 for permitting rotation thereof in one direction only. Since the ratchet wheel 75 is mounted for rotation with the gear wheel 68 which, in turn, is disposed in driving engagement with the pinion 44, it will be understood that the operating arm 18 can be rotated only in one direction. Therefore, it will not be possible to rotate the disc 65 in a reverse direction, thereby possibly providing a false indication.

In describing the functioning of the resetting mechanism 17 it will be assumed that the maximum demand pointer 15 has been operated by the maximum demand indicator 13 to a position such as illustrated in Figure 1 of the drawings. The seal 21 is then removed and the operating arm 18 is curved upward slightly, as indicated in Figure 5 of the drawings. In this position the operating arm 18 clears the upstruck lug 19 and it may be rotated in the direction as permitted by the ratchet wheel 75. The initial position of the pin 29 in the shaft 27 is as illustrated in Figure 7 of the drawings. In this position the arm 51 is out of the path of the pin 50 carried by the finger 48, since the shaft 27 is biased to its innermost position by the spring 41. As the operating arm 18 is rotated, the pin 29 rides up the inclined side 34 of the slot 32 and a corresponding outward movement of the shaft 27 takes place to cause the arm 51 to be positioned in driving engagement with the pin 50. The finger 48 is then rotated by the continued movement of the operating arm 18 to the position shown by the broken lines in Figure 2 of the drawings, where the pin 49 will engage the maximum demand pointer 15. The continued movement of the operating arm 18 will restore the maximum demand pointer 15 to its initial position corresponding to the division marked 0 on the scale 16. At or about this position the pin 29 is moved past the perpendicular side 33 of slot 32 and as a result the shaft 27 is moved inwardly under the biasing force of the spring 41. The driving connection between the arm 51 and the pin 50 is then released and the finger 48 is restored to engagement with the upturned tongue 56 of the adjusting arm 53 by means of the spring 54.

In the event that the pin 24 has not dropped into the slot 32 at the time when the maximum demand pointer 15 has been restored to its initial position, the continued rotation of the operating arm 18 will not tend to cause any further movement thereof, since the pin 49 can move within the confines of the slot 57 against the biasing force of the spring 61.

For each revolution of the operating arm 18 the disc 65 is rotated through one-twelfth of a revolution for causing the name of the next month to register with the window 67 in the bottom of the casing 38. The operating arm 18 may then be restored to its initial position with respect to the lug 19 and the seal 21 may be replaced.

Since certain further constructions may be made in the foregoing embodiments of the invention, it is intended that all matters set forth in the foregoing description or shown in the accompanying drawings shall be interpreted as illustrative, and not in a limiting sense.

I claim as my invention:

1. A mechanism for resetting the maximum demand pointer of a watt hour meter to its initial position comprising, in combination, flexible means for engaging said pointer to restore it to its initial position, manually operable means movable through a complete revolution, connecting means for placing said manually operable means in driving engagement with said flexible means, and means for automatically releasing said driving engagement when said pointer is restored to its initial position.

2. A mechanism for resetting the maximum demand pointer of a watt hour meter to its initial position comprising, in combination, a finger rotatable through substantially the same arc as said pointer, flexible means carried by said finger, and manually operable means movable through a complete revolution for operating said finger to cause said flexible means to engage said pointer for restoring it to its initial position.

3. A mechanism for resetting the maximum demand pointer of a watt hour meter to its initial position comprising, in combination, a finger rotatable through substantially the same arc as said pointer, flexible means carried by said finger, manually operable means movable through a complete revolution, means for placing said manually operable means in driving engagement with said finger to cause said flexible means to engage said pointer for restoring it to its initial position, and means for automatically releasing said driving engagement when said finger is operated to a predetermined position corresponding to the initial position of said pointer.

4. A mechanism for resetting the maximum demand pointer of a watt hour meter to its initial position comprising, in combination, a finger disposed to engage said pointer for restoring it to its initial position, resilient means for biasing said finger to an initial position corresponding to the maximum position of said pointer, adjustable stop means for adjusting the initial position of said finger, manually operable means movable through a complete revolution, means for placing said manually operable means in driving engagement with said finger, and means for automatically releasing said driving engagement when said pointer is restored to its initial position.

RET O. HAMILL.